US012486141B2

(12) United States Patent
Ogawa

(10) Patent No.: US 12,486,141 B2
(45) Date of Patent: Dec. 2, 2025

(54) ELEVATOR HALL OPERATION PANEL

(71) Applicant: Mitsubishi Electric Corporation, Tokyo (JP)

(72) Inventor: Hideyuki Ogawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1525 days.

(21) Appl. No.: 16/966,061

(22) PCT Filed: Feb. 9, 2018

(86) PCT No.: PCT/JP2018/004563
§ 371 (c)(1),
(2) Date: Jul. 30, 2020

(87) PCT Pub. No.: WO2019/155598
PCT Pub. Date: Aug. 15, 2019

(65) Prior Publication Data
US 2020/0354191 A1 Nov. 12, 2020

(51) Int. Cl.
*B66B 1/46* (2006.01)

(52) U.S. Cl.
CPC .............. *B66B 1/466* (2013.01); *B66B 1/467* (2013.01)

(58) Field of Classification Search
CPC ....... B66B 1/466; B66B 1/467; B66B 19/007; B66B 7/00
See application file for complete search history.

(56) References Cited

U.S. PATENT DOCUMENTS 5,829,554 A * 11/1998 Benson .................. B66B 1/466 187/397
2006/0054421 A1* 3/2006 Ikeda ..................... B66B 3/023 187/395

FOREIGN PATENT DOCUMENTS

| | | | |
|---|---|---|---|
| JP | 58-144567 | U | 9/1983 |
| JP | 03-042481 | A | 2/1991 |
| JP | 10-291746 | A | 11/1998 |
| JP | 11-349254 | A | 12/1999 |
| JP | 2002-128416 | A | 5/2002 |
| JP | 2003-246556 | A | 9/2003 |
| JP | 2007-131433 | A | 5/2007 |
| JP | 2010-208724 | A | 9/2010 |
| KR | 20-1997-0038866 | U | 7/1997 |

(Continued)

OTHER PUBLICATIONS

Office Action dated on Jan. 19, 2021, in corresponding Japanese patent Application No. 2019-570238, 4 pages.

(Continued)

*Primary Examiner* — Jeffrey Donels
(74) *Attorney, Agent, or Firm* — XSENSUS LLP

(57) ABSTRACT

In the modernization of a hall display device, the number of cables connected to operating equipment may increase since the shape and the number of pushbuttons, indicators and the like are changed. In this case, it is necessary to further process a hole at the worksite for passing the cables in accordance with the number of cables, which makes the work complicated. In the present invention, a frame having an opening in the center is fixed to a hall wall, and a front plate having operating equipment is fixed in a way as to cover the opening on the hall side of the frame. A back plate having a hole for passing cables is detachably fixed in a way as to cover the opening on the elevator hoistway side.

3 Claims, 5 Drawing Sheets

(56) References Cited

FOREIGN PATENT DOCUMENTS

| | | | | | |
|---|---|---|---|---|---|
| WO | WO-2004050524 | A1 | * | 6/2004 | ............. B66B 1/462 |
| WO | WO-2016147248 | A1 | * | 9/2016 | ............... B66B 1/46 |

OTHER PUBLICATIONS

Office Action issued Jan. 8, 2022 in Korean Patent Application No. 10-2020-7022311, 6 pages.
International Search Report and Written Opinion mailed on Apr. 10, 2018 for PCT/JP2018/004563 filed on Feb. 9, 2018, 8 pages including English Translation of the International Search Report.
Office Action issued on Mar. 30, 2021, in corresponding Japanese patent Application No. 2019-570238, 4 pages.
Office Action dated May 19, 2022 issued in corresponding CN Patent Application No. 201880088419.3, 13 pages (with English Translation).
Krause, Werner: Gerätekonstruktion, 2. Aufl. Berlin, VEB Verlag Technik, 1986, Dg. Nr. 370/92/86, (relevant pages cited in the text), 7pp.
German Office Action issued Sep. 26, 2025, in corresponding German Patent Application No. 112018007044.1, 18pp.

* cited by examiner

ELEVATOR HALL OPERATION PANEL

CROSS-REFERENCE TO RELATED APPLICATION

The present application is based on PCT filing PCT/JP2018/004563, filed Feb. 9, 2018, the entire contents of which are incorporated herein by reference.

TECHNICAL FIELD

The present invention is devised to provide a hall operation panel for an elevator provided in a hall.

BACKGROUND ART

In the hall operation panel, a box having an opening in the front face is fixed to a building wall by welding or the like. The opening of the box is provided with a cover plate including elevator call buttons, a car position indicator lamp, and an operation direction indicator lamp. The back face of the box is provided with a wiring hole for passing a cable for a call button or the like to the elevator hoistway side. The cable passing through the wiring hole is fixed downward along the back face of the box by a clamp (Patent Document 1).

PRIOR ART DOCUMENT

Patent Document

Patent Document 1: Japanese Unexamined Patent Application Publication No. H3-42481 (FIG. 2)

SUMMARY OF INVENTION

Technical Problem

The configuration according to the prior art easily fits a building wall which tends to be thin in recent years because the cable is unlikely to project into the elevator hoistway side and can be wired in a space-saving manner. However, the wiring hole provided on the back face is provided in a size for a cable for equipment initially installed.

In the renewal (modernization) of a hall operation panel, the layout for new equipment increases the number of cables. In order to pass the increased cables, it is necessary to enlarge the wiring hole provided on the back face of the box. However, on-site work is complicated because the work needs to be performed with the box fixed to the building wall.

The present invention has been made in order to solve the above problems, and an object of the present invention is to provide a hall operation panel whose wiring is easy to carry out even when the number of cables for equipment used for the modernization increases.

Solution to Problem

A hall operation panel for an elevator according to the present invention includes:

a frame that includes a pair of side plates and top and bottom plates each connecting ends of the side plates, thereby forming an opening, and is to be fixed to a hall wall;

a front plate including operating equipment and to be fixed to the frame in a way as to cover a hall side of the opening of the frame; and a back plate having a wiring hole for passing a cable for the operating equipment to an elevator hoistway side and to be detachably fixed to the frame in a way as to cover the elevator hoistway side of the opening of the frame.

Advantageous Effects of Invention

According to the present invention, even if the number of cables increases due to the increase in the number of pieces of equipment to be used, the back plate can be replaced with another back plate having a wiring hole of an optimum size for passing the cables. Alternatively, the size of the wiring hole can be easily adjusted by detaching the back plate. Thus, the modernization can be easily achieved.

DESCRIPTION OF EMBODIMENTS

Details of the present invention will be described below with reference to the drawings.

Embodiment 1

Figure 1:
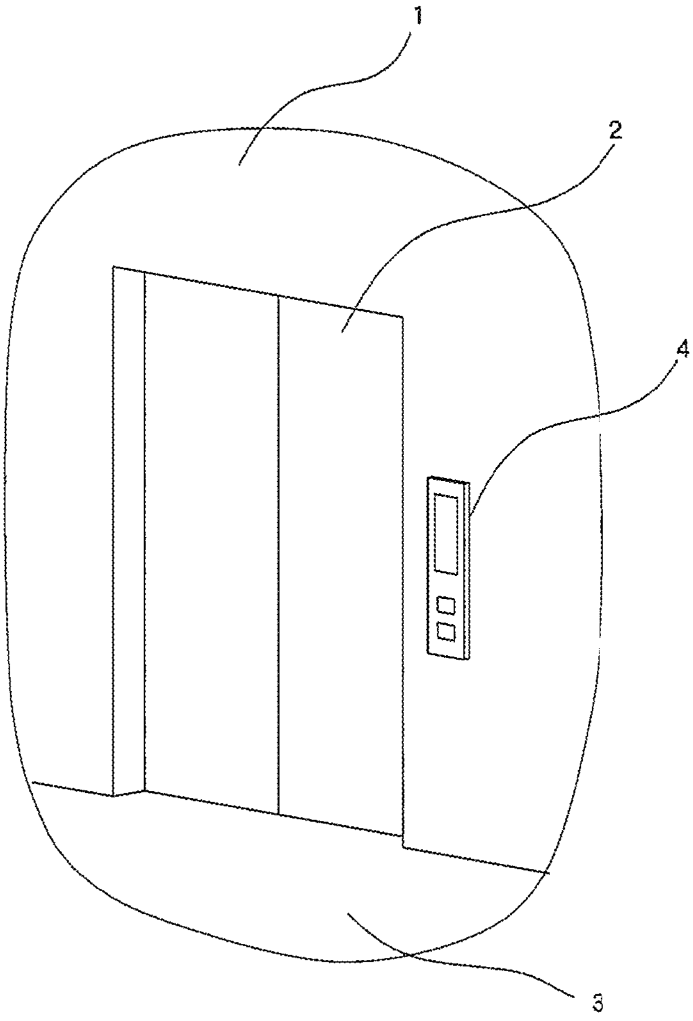
FIG. 1 is a schematic view of a hall in which a hall operation panel according to Embodiment 1 of the present invention is provided.

FIGS. 1 to 5 illustrate Embodiment 1 of the present disclosure. In the drawings, the same symbols indicate the same components, and the description thereof is omitted. FIG. 1 shows a schematic view of an elevator hall in which a hall operation panel of the present disclosure is provided. An entrance 2 of an elevator is provided in a building wall 1 which is a hall wall of a hall 3. A hall operation panel 4 for calling the elevator and displaying an operating state is provided on the building wall 1 beside the entrance 2. The elevator hoistway in which the elevator car travels is located on the other side of the entrance 2 (neither of them is shown).

Figure 2:
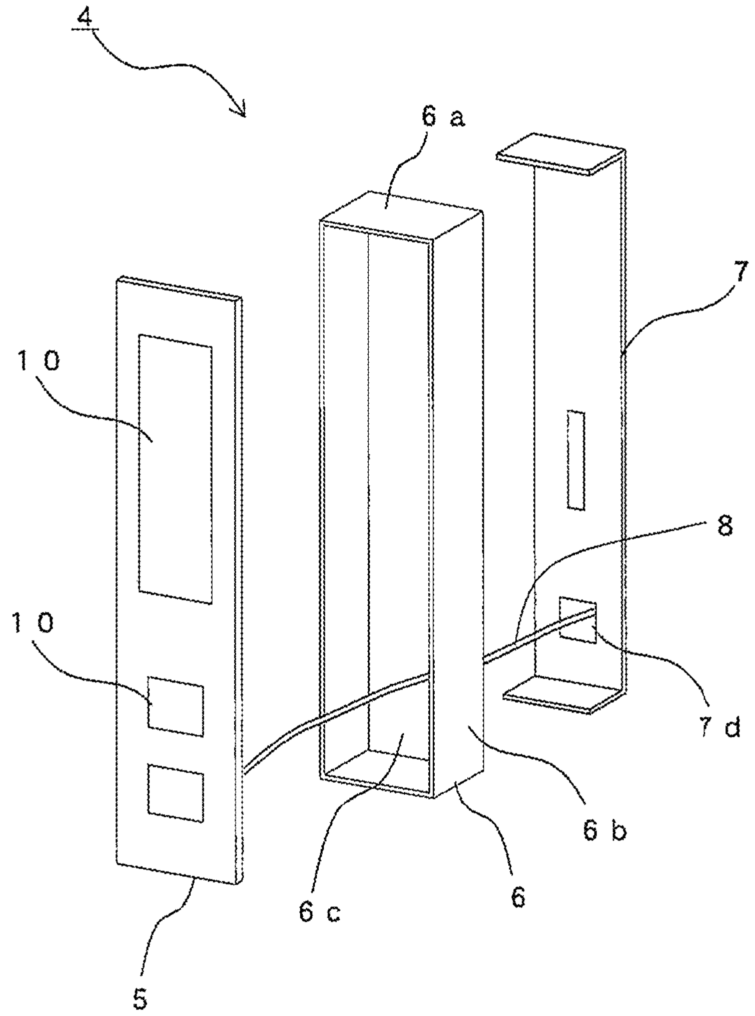
FIG. 2 shows a hall operation panel.

FIG. 2 shows the hall operation panel 4. The hall operation panel 4 includes a frame 6, a front plate 5, and a back plate 7. In the structure of the frame 6, the upper and lower ends of a pair of side plates 6*b* are connected to each other by top and bottom plates 6*a*, respectively, and an opening 6*c* is provided in the center of the frame 6. The frame 6 is fixed to the building wall 1 by welding or the like. The building wall 1 is provided with an opening that penetrates or partially penetrates up to the hoistway, and the frame is fixed in the opening. The front plate 5 is provided with operating equipment 10 and is fixed to the frame 6 in a way as to cover the hall side of the opening 6*c* of the frame 6. The back plate 7 is fixed to the frame 6 in a way as to cover the elevator hoistway side of the opening 6*c*. Note that the operating equipment 10 may be disposed inside the frame 6.

When the front plate 5 is fixed to the frame 6, a cable 8 for the operating equipment 10 provided on the front plate 5 passes through the opening 6*c* of the frame 6. The cable 8 is wired to the elevator hoistway side through a wiring hole 7*d* of the back plate 7 fixed to the frame 6.

Figure 3:
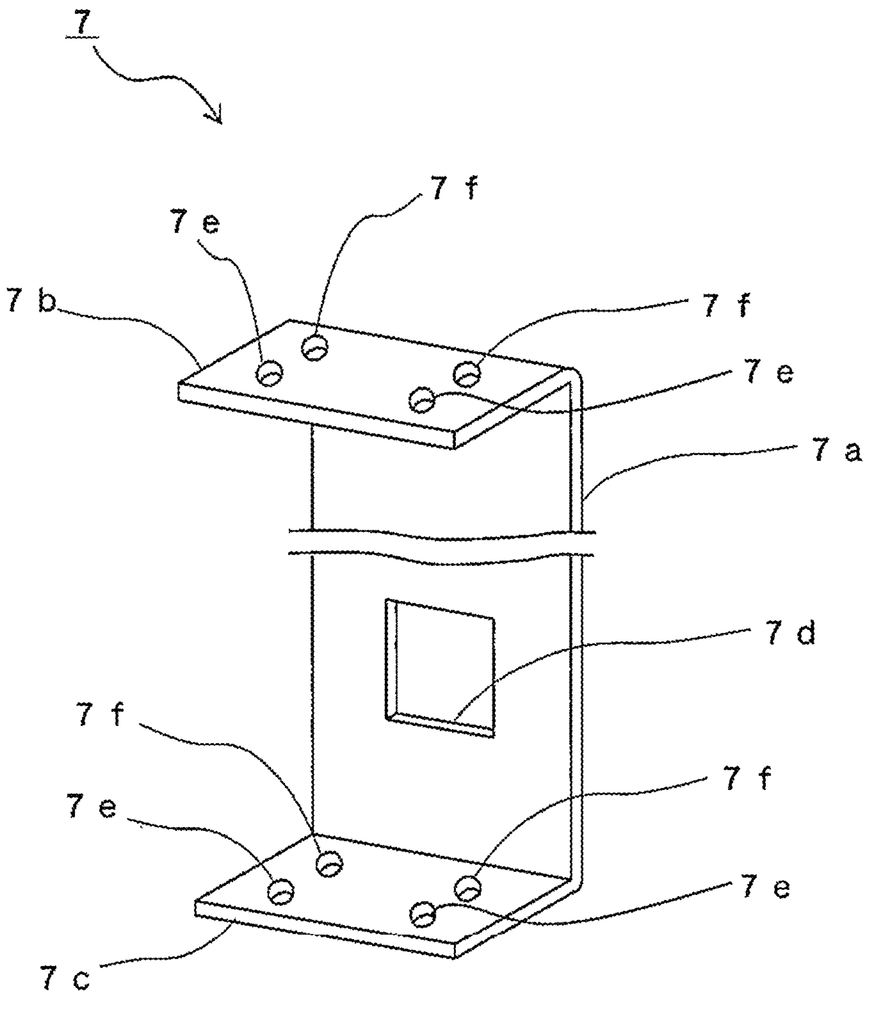
FIG. 3 shows a back plate of the hall operation panel.

FIG. 3 shows the back plate 7 of the hall operation panel 4. In the back plate 7, a top face plate 7*b* and a bottom face plate 7*c*, which are fixing portions, are provided at the end portions in the vertical direction of the back face plate 7*a*. Thus, the back plate 7 is formed to have a C-shaped cross section. The back face plate 7*a* is provided with a wiring hole 7*d* through which the cable 8 for the operating equipment 10 passes. The top face plate 7*b* and the bottom face plate 7*c* are provided with holes 7*e* and holes 7*f* for passing bolts to fix them to the frame 6. A pair of holes 7*e* and a pair of holes 7*f* are provided on each of the top face plate 7*b* and the bottom face plate 7*c*. The holes 7*e* are provided on the end sides of the top face plate 7*b* and the bottom face plate 7*c*, and the holes 7*f* are provided on the back face plate 7*a* side.

Figure 4:
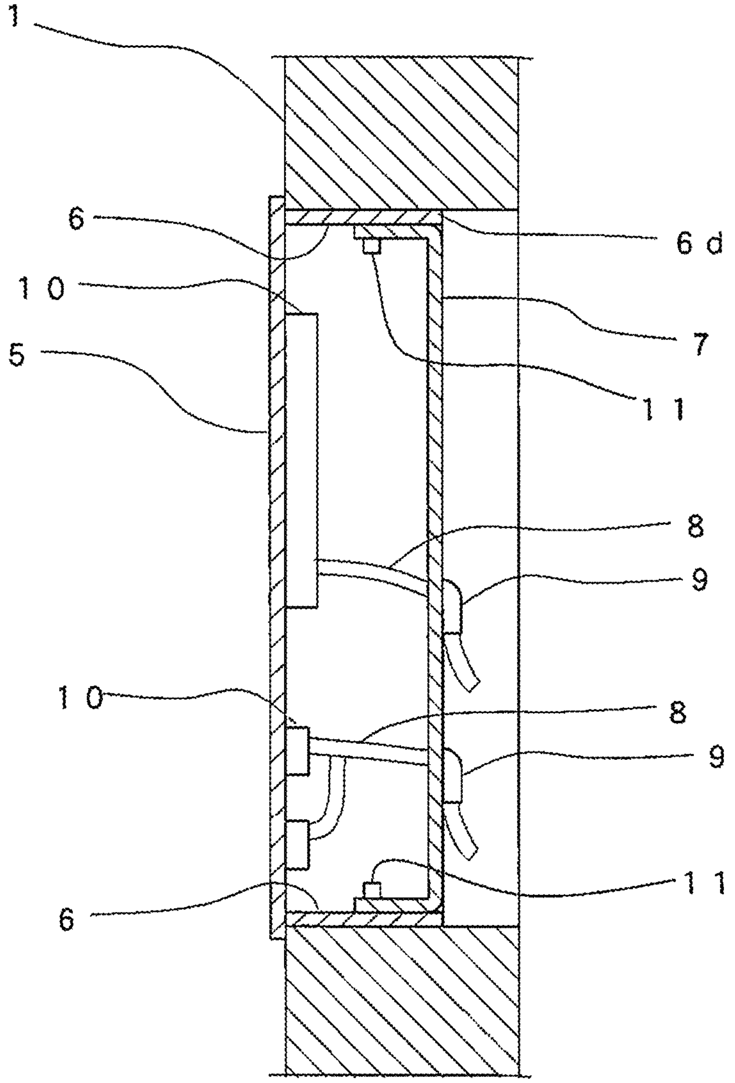
FIG. 4 shows a cross-section of the hall operation panel of FIG. 1.

FIG. 4 shows a cross section of the hall operation panel 4. In the drawing, the left side of the building wall 1 is the hall and the right side is the elevator hoistway. The front plate 5 is fixed by welding or the like to the frame 6 that is fixed to the building wall 1. In the embodiment of the present disclosure, since the outer dimension of the front plate 5 is larger than that of the frame 6, the outer edge of the front plate 5 overlaps the building wall 1.

The back plate 7 is fixed to the frame 6 by bolts 11. The back plate 7 is fixed to the frame 6 so as to be flush with the end face 6*d* of the frame 6 on the elevator hoistway side. The bolts 11 are inserted through the holes 7*e* of the top face plate 7*b* and the bottom face plate 7*c* and fastened to screw holes provided on the frame 6 in order to fix the back plate 7 to the frame 6. The cable 8 for the operating equipment 10 is passed through the back plate 7. The cable 8 is fixed along the back plate 7 by a clamp 9 from the elevator hoistway side.

"In a Case of Thin Building Wall"

Figure 5:
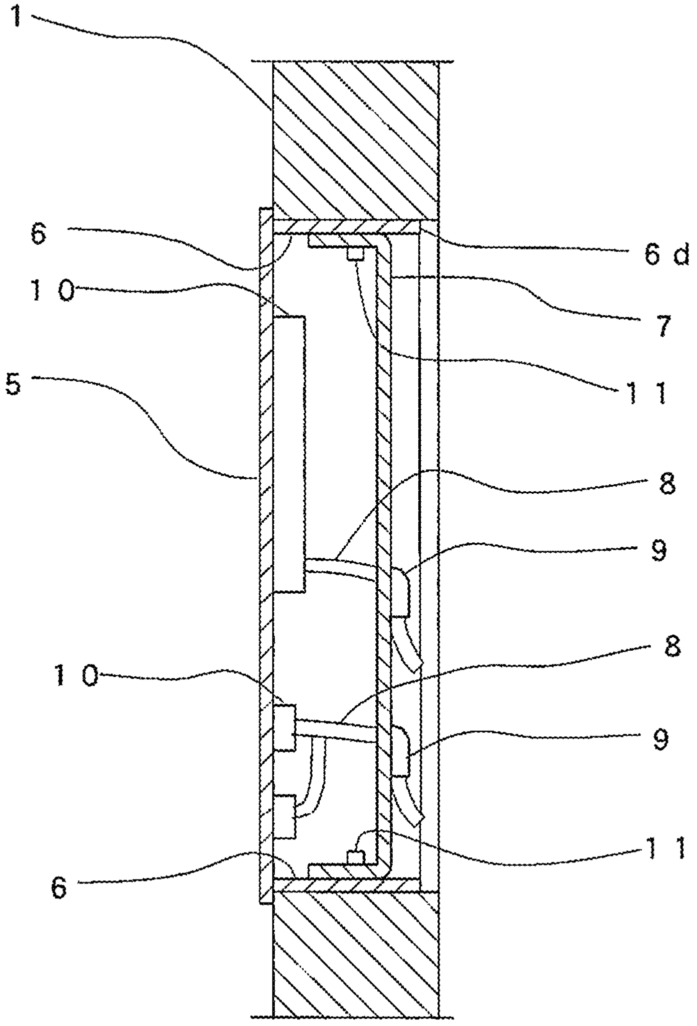
FIG. 5 shows a cross section of a hall operation panel provided to a thin building wall.

The above description is for the case of ordinary modernization. In recent years, however, the thickness of the building wall tends to be thin, so that the thickness of the hall operation panel including the external wiring is required to be reduced. Next, therefore, the case where the building wall thickness is thin will be described. FIG. 5 shows a cross section of the hall operation panel 4 when the building wall is thin. The back plate 7 is fixed to the frame 6 by inserting the bolts 11 through the holes 7*f* of the top face plate 7*b* and the bottom face plate 7*c* and fastening the bolts 11 to the screw holes provided in the frame 6. As shown in the drawing, the back plate 7 is disposed in the frame 6 at an inner side from the end face 6*d* on the elevator hoistway side. The cable 8 for the operating equipment 10 is fixed to the back plate 7 by the clamp 9, which is disposed at an inner side from the end face 6*d* on the elevator hoistway side of the frame 6.

As shown in the above description, the back plate 7 is provided in the frame 6 capable of being adjusted in its position in the front-back direction inside the frame 6. For example, each of pairs of holes 7*e* and 7*f* in the top face plate 7*b* and the bottom face plate 7*c* may be an elongated hole by connecting them together. Also in this case, the back plate 7 can be fixed to the frame 6 by the bolts 11 at an arbitrary position in the front-back direction inside the frame 6.

According to Embodiment 1, the following effects can be obtained. The hall operation panel 4 of an elevator includes the frame 6 to be fixed to the hall wall 1, the front plate 5 having the operating equipment 10 and to be fixed to the frame 6 in a way as to cover the hall side of the frame 6, and the back plate 7 having the wiring hole 7*d* for passing the cables 8 for the operating equipment 10 to the elevator hoistway side and to be detachably fixed to the frame 6 in a way as to cover the elevator hoistway side of the frame 6. In the case of the modernization, even if the cables 8 for the operating equipment 10 increase in the number, the back plate 7 may be replaced with another back plate being prepared and having a wiring hole 7*d* with an optimum size. Alternatively, the back plate 7 may be detached to adjust the size of the wiring hole 7*d*. Thus, even if the cables 8 increase in the number, wiring work can be easily performed. That is, the modernization can be easily carried out.

Since the position of the back plate 7 to be fixed to the frame 6 can be adjusted in the hoistway direction, the back plate 7 can be disposed in the frame 6 at an inner side from the end face of the frame 6 on the hoistway side. Thus, even when the cable 8 for the operating equipment 10 is large in the number, cable projection from the frame 6 into the elevator hoistway side can be reduced.

Further, since the back plate 7 has the fixing portions at the top and bottom ends and is formed to have a C-shaped cross section, with the simple configuration, the position of the back plate 7 can be adjusted in the hoistway direction of the frame 6.

REFERENCE SIGNS LIST

4 hall operation panel
5 front plate
6 frame
6*a* top and bottom plates
6*b* side plate
6*c* opening
6*d* end
7 back plate
7*a* back face plate
7*b* top face plate
7*c* bottom face plate
7*e*, 7*f* hole
7*d* wiring hole
8 cable
9 clamp
10 operating equipment
11 bolt

What is claimed is:

1. A hall operation panel for an elevator, comprising:
a frame that includes a pair of side plates and top and bottom plates each connecting ends of the side plates, thereby forming an opening, and is to be fixed to a hall wall, a size of the opening of the frame on the hall side being equal to a size of the opening of the frame on the elevator hoistway side;
a front plate including operating equipment and to be fixed to the frame in a way as to cover a hall side of the opening of the frame; and
a back plate having a wiring hole for passing a cable for the operating equipment to an elevator hoistway side and to be detachably fixed to the frame in a way as to cover the elevator hoistway side of the opening of the frame,
wherein a position of the back plate to be fixed to the frame can be adjusted in a front-back direction of the frame while the back plate remains fixed to the frame.

2. The hall operation panel for an elevator according to claim 1, wherein the back plate includes fixing portions to be fixed to the top and bottom plates and a back face plate connecting the fixing portions and is formed to have a C-shaped cross section.

3. A hall operation panel for an elevator, comprising:

a frame that includes a pair of side plates and top and bottom plates each connecting ends of the side plates, thereby forming an opening, and is to be fixed to a hall wall, a size of the opening of the frame on the hall side being equal to a size of the opening of the frame on the elevator hoistway side;

a front plate including operating equipment and to be fixed to the frame in a way as to cover a hall side of the opening of the frame; and a back plate having a wiring hole for passing a cable for the operating equipment to an elevator hoistway side and to be detachably fixed to the frame in a way as to cover the elevator hoistway side of the opening of the frame, wherein the back plate is formed of three planar regions, the three planar regions include a first planar region through which the wiring hole passes, a second planar region that is perpendicular to the first planar region and has holes through which first attachment bolts are configured to pass to detachably fix the back plate to the top plate, and a third planar region that is perpendicular to the first planar region and parallel to the second planar region and has holes through which second attachment bolts are configured to pass to detachably fix the back plate to the bottom plate.

* * * * *